Jan. 18, 1927.
T. B. CAMPBELL, JR
1,614,873
TRACTION DEVICE
Filed June 22, 1925
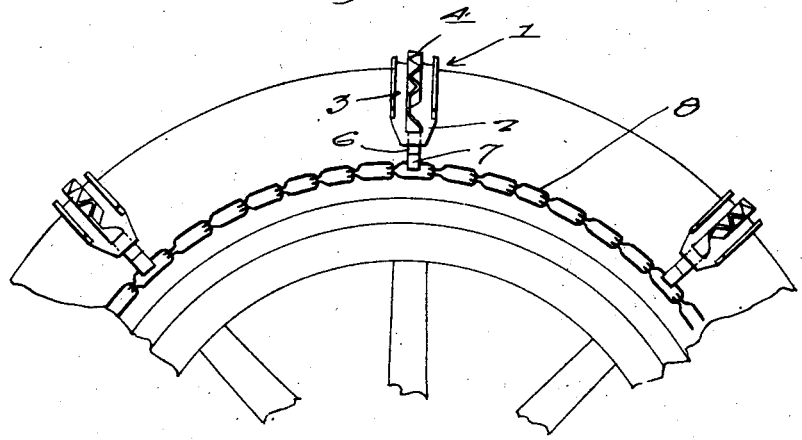
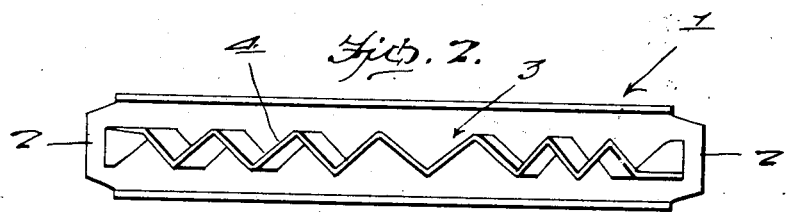
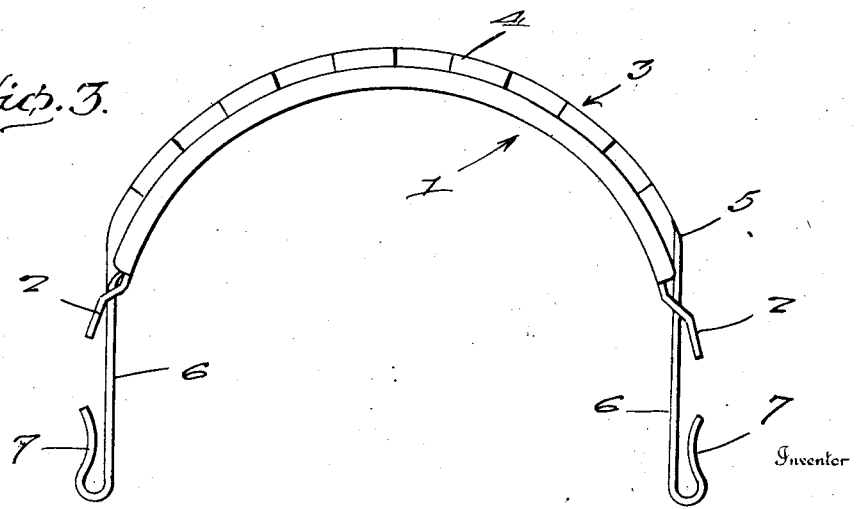

Patented Jan. 18, 1927.

1,614,873

UNITED STATES PATENT OFFICE.

THOMAS BENTON CAMPBELL, JR., OF CASTLE SHANNON, PENNSYLVANIA, ASSIGNOR OF ONE-HALF TO JAMES ROBERT CAMPBELL, OF CASTLE SHANNON, PENNSYLVANIA.

TRACTION DEVICE.

Application filed June 22, 1925. Serial No. 38,759.

This invention relates to an improved structure which may be broadly referred to as a traction device, the same having particular reference to a device which is adapted for use upon automobile wheels for enabling a better traction to be obtained, and to guard against undue slipping on ice covered or muddy surfaces.

The primary object is to generally improve upon devices of this class by providing one of comparative simplicity and durability which embodies novel details of construction arranged in a manner to insure the protection of a practical device under any and all conditions.

Other objects and advantages of the invention will become apparent from the following description.

In the accompanying drawing forming a part of this application and in which like numerals are employed to designate like parts throughout the same:

Figure 1 is a fragmentary elevational view of a portion of a conventional automobile wheel showing a traction device, constructed in accordance with the present invention, applied thereto.

Figure 2 is a top plan view of one of the devices removed.

Figure 3 is an end or edge elevation of the same.

Referring to the drawings in detail it will be seen that each device comprises a channel shaped saddle 1, the ends of the base of which are extended as at 2, the same being provided with transverse slots of a predetermined width. From Figure 3 it will be noted that the extensions are offset somewhat for a purpose to be hereinafter made clear. Cooperative with the saddle is an anti-slipping or traction member generally designated by the reference character 3. This is preferably formed from a strip of material formulated to provide a zig-zag intermediate portion 4. The end portions are twisted as at 5 and extended inwardly to provide attaching arms 6, the extremities of these arms being formulated into hooks 7 adapted to be selectively engaged with the links of the side chains 8. It is clear that the arms 6 are extended through the slots formed in the aforesaid extensions 2. The advantage of this arrangement is that the traction member is separate and independent of the saddle, thereby permitting substantial permanent use of the saddle, which must be accurately shaped to conform to the tread of the tire, but permitting replacement of the traction members as they wear out.

A consideration of the description in connection with the drawings will enable persons skilled in the art to which the invention relates to obtain a clear understanding of the same. Therefore, a more lengthy description is thought unnecessary.

While the preferred embodiment of the invention has been shown and described, it is to be understood that minor changes coming within the field of invention claimed may be resorted to if desired.

Having thus described the invention, what I claim as new and desire to secure by Letters Patent is:—

In a traction device for vehicle wheels, a saddle adapted to extend transversely across the tire on said wheel and being bent to conform to the contour thereof, said saddle being substantially channel shaped in cross section and having the end portions of the base formulated to provide extensions, each of said extensions having a transversely extending slot formed therein, and an independent traction member seated in the saddle, the same comprising an elongated strip of metal having its intermediate portion bent into zig-zag formation, the end portions of the strip being twisted and thence disposed downwardly through the respective slots formed in the extensions of said saddle to provide a pair of downwardly extending arms, the free ends of the arms being bent upwardly to provide attaching hooks adapted to be connected with the usual side chains.

In testimony whereof I affix my signature.

THOMAS BENTON CAMPBELL, JR.